United States Patent
Trinko et al.

(10) Patent No.: US 8,515,673 B2
(45) Date of Patent: Aug. 20, 2013

(54) CRIME RISK ASSESSMENT SYSTEM

(76) Inventors: Dominic Trinko, LaCrosse, WI (US); Thomas Trinko, Menasha, WI (US)

(*) Notice: Subject to any disclaimer, the term of this patent is extended or adjusted under 35 U.S.C. 154(b) by 299 days.

(21) Appl. No.: 13/096,601

(22) Filed: Apr. 28, 2011

(65) Prior Publication Data

US 2011/0261067 A1  Oct. 27, 2011

Related U.S. Application Data

(63) Continuation-in-part of application No. 12/597,425, filed on Oct. 23, 2009, now Pat. No. 8,290,705.

(60) Provisional application No. 61/328,786, filed on Apr. 28, 2010.

(51) Int. Cl.
*G01C 21/00* (2006.01)

(52) U.S. Cl.
USPC .......................................... 701/532

(58) Field of Classification Search
None
See application file for complete search history.

(56) References Cited

U.S. PATENT DOCUMENTS

| | | | |
|---|---|---|---|
| 5,802,492 A | 9/1998 | DeLorme et al. | |
| 6,175,803 B1 | 1/2001 | Chowanic et al. | |
| 6,615,133 B2 | 9/2003 | Boies et al. | |
| 7,149,533 B2 | 12/2006 | Laird et al. | |
| 8,289,171 B2* | 10/2012 | Morley | 340/573.4 |
| 2005/0086088 A1 | 4/2005 | Stiles et al. | |
| 2009/0198641 A1* | 8/2009 | Tortoriello | 706/52 |
| 2009/0248643 A1* | 10/2009 | Wasson | 707/3 |
| 2011/0161116 A1* | 6/2011 | Peak et al. | 705/4 |

FOREIGN PATENT DOCUMENTS

| | | |
|---|---|---|
| JP | 2006184030 | 7/2006 |
| KR | 1020060113135 | 11/2006 |

OTHER PUBLICATIONS

Lee, Hyeon Hong, PCT International Search Report dated Aug. 27, 2008, Korean Intellectual Property Office, Seonsa-ro, Seogu, Daejeon, Republic of Korea.

\* cited by examiner

*Primary Examiner* — Michael J Zanelli
(74) *Attorney, Agent, or Firm* — Boyle Fredrickson S.C.

(57) ABSTRACT

A method of providing crime risk data in the absence or partial absence of officially reported data uses a scoring system based on images of locations within particular regions where crime data is to be assessed. The collected crime data may be normalized to actual crime data were both exist to calibrate the proxy crime data derived from the images.

14 Claims, 7 Drawing Sheets

FIG. 13
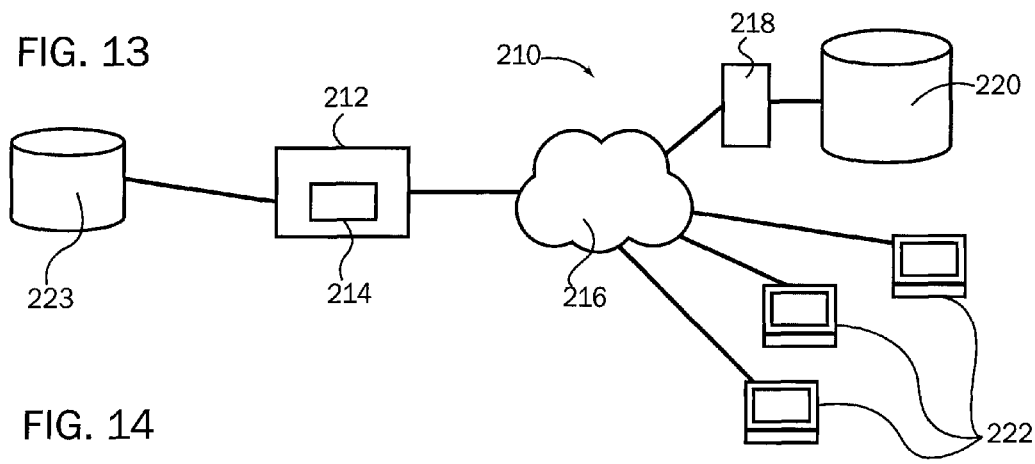
FIG. 14
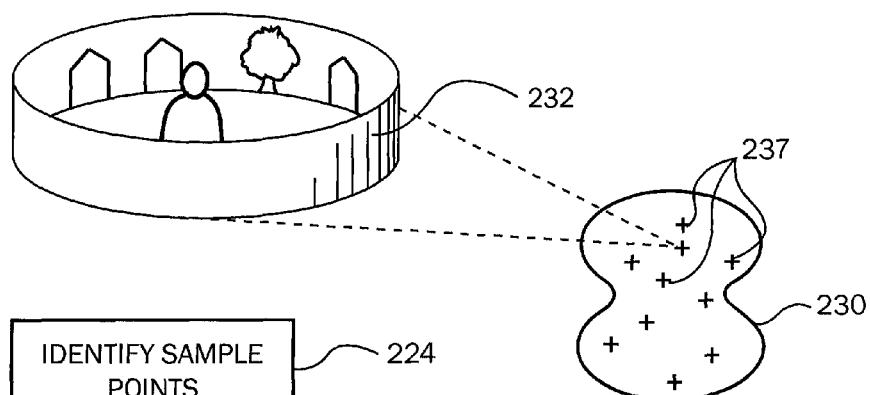
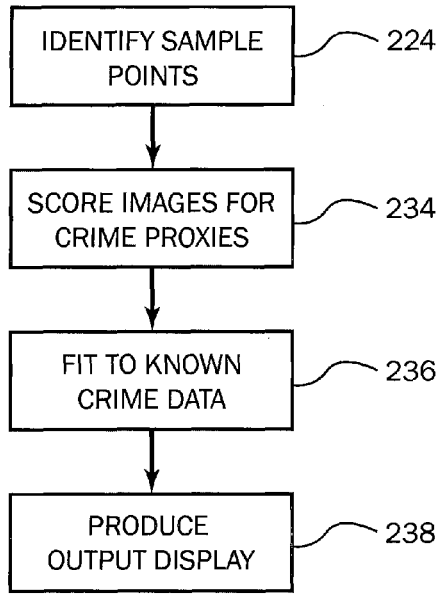
FIG. 15
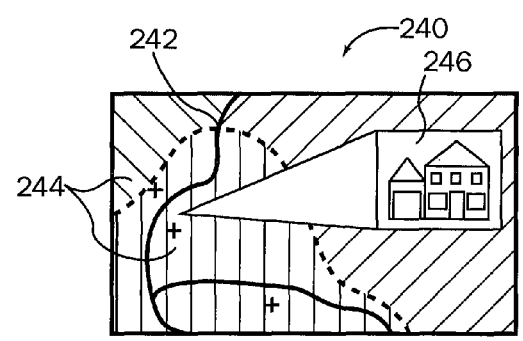
FIG. 16

CRIME RISK ASSESSMENT SYSTEM

CROSS REFERENCE TO RELATED APPLICATION

This application claims the benefit of 61/328,786, filed Apr. 28, 2010, and is a continuation in part of U.S. patent application Ser. No. 12/597,425, filed Oct. 23, 2009, now U.S. Pat. No. 8,290,705 entitled "Mobile Navigation System with Graphic Crime-Risk Display", both hereby incorporated by reference.

BACKGROUND OF THE INVENTION

The present invention relates to information systems for use by travelers and in particular to an information system which provides the user with an indication the crime risk of a particular location.

GPS and other navigation systems for portable use may contain digital maps of specific areas and may superimpose a user's location determined by the GPS on a graphical representation of the map. While the maps used in GPS systems currently are relatively static, it is also known to provide an ability to download updated or new maps with the GPS system to keep the loaded map system current, to load new maps for new areas or use wireless or cellular technology to exchange map information. The maps may include points of interest, restaurants, and other data likely to be useful to the traveler.

Such systems are in particular demand by users who are unfamiliar with the roads in an area, and for this reason are particularly attractive to travelers and offered as a feature in rental cars. A traveler with a GPS system and an updated map, however, may have a false sense of security based on a knowledge of his or her location on the map but an ignorance about the safety of that location. For this reason, it has been proposed to provide a map overlay or the like indicating a risk of crime in the user's location as displayed on the GPS system. One such system is described in PCT application PCT/US2008/061482 claiming a priority date of Nov. 26, 2007 and entitled: "Mobile Navigation System with Graphic Crime-Risk Display" hereby incorporated by reference.

A potential barrier to providing crime risk information to travelers and the like is in obtaining accurate crime data. While many municipalities by law must make such data available, the information is not always presented in a form that may be readily collected and disseminated to the public. Communities often have mixed incentive to accurately report crime and many communities provide no such reporting.

The above referenced patent application describes using non-crime data such as population density, average income, density of government buildings and police stations and the like to supplement actual crime data. Such proxy data is imperfect and additional or superior proxy data would therefore be desirable.

SUMMARY OF THE INVENTION

The present invention provides a source of proxy data derived from actual images of an area, scored according to visual features that are correlated to crime. Such images may be obtained readily from services such as Google using services such as Street View™ and Panoramio™ and may be scored automatically by image processing software or manually using Internet systems such as Mechanical Turk™ which enlist individuals.

Specifically, the invention may provide a method of deriving crime data for different regions comprising the steps of: (a) collecting image data of the regions; (b) scoring the image data according to proxies for crime risk; and (c) presenting a map of the regions on a graphic display terminal having multiple shaded zones depicting crime risk based on the scoring for each region.

It is thus a feature of at least one embodiment of the invention to provide a continuous or semi-continuous crime risk overlay in the face of absence of crime data for many locations.

The method may further collect reported crime data by law enforcement officials for at least some regions and compare the scoring of the image data for the regions to the collected crime data to derive normalization information. The normalization information may be applied to the scores for regions where reported data by law enforcement officials has not been collected to provide uniform crime data for the different regions.

It is thus a feature of at least one embodiment of the invention to employ actual crime data to calibrate the proxy crime data.

The scoring of image data may evaluate factors selected from the group of visibility of trash, visibility of graffiti, visibility of window bars.

It is thus a feature of at least one embodiment of the invention to identify visual features highly correlated to crime risk.

The scoring of image data may evaluate factors selected from the group of visibility of late model cars, quality of the road surface, business types, number of residences visible.

It is thus a feature of at least one embodiment of the invention to identify visual features indirectly related to crime risk.

The spacing of the collection of images of the region may be adjusted according to the scoring of a region.

It is thus a feature of at least one embodiment of the invention to compensate for inaccuracy in the proxy process by increasing sampling density.

The scoring is performed by individuals viewing the images.

It is thus a feature of at least one embodiment of the invention to provide a system that may accommodate a wide variety of image types.

The images may be presented to the individuals as a panorama of 360°.

It is thus a feature of at least one embodiment of the invention to ensure a comprehensive review of an environmental area.

The scoring may include a marking of the images by the user viewing the images to highlight components of the scoring.

It is thus a feature of at least one embodiment of the invention to provide the ability to reveal the underlying basis for the proxy to the end-user.

The invention may provide an apparatus for implementation of the above method and in particular a navigation system having a graphics display and an electronic memory storing: (i) a street map; and (ii) crime data linked to locations. A computer executing a stored program may communicate with the graphics display, and the electronic memory to: (i) generate a display of a street map different locations; (ii) generate an overlay to the street map depicting the crime data different locations; (iii) generate an indication of whether the overlay is generated from officially collected crime data or from a proxy for crime data.

It is thus a feature of at least one in body meant of the invention to provide an indication to the user of the basis for the crime risk data so as to improve confidence in the system.

These and other object of the invention may apply to only some embodiments described herein and thus should not be used to define the scope of the invention

BRIEF DESCRIPTION OF THE DRAWINGS

FIG. 13 is a simplified system of a computer system communicating on a network for generation of the crime risk data per the present invention;

FIG. 14 is a schematic representation of panoramic image data available at a variety of sample points for which crime data must be determined;

FIG. 15 is a flow chart of the principal steps of the present invention as may be implemented entirely or in part on an automatic basis in an electronic computer; and FIG. 16 is a display produced by the present invention showing crime risk and supporting images.

DETAILED DESCRIPTION OF THE PREFERRED EMBODIMENT

Figure 1:
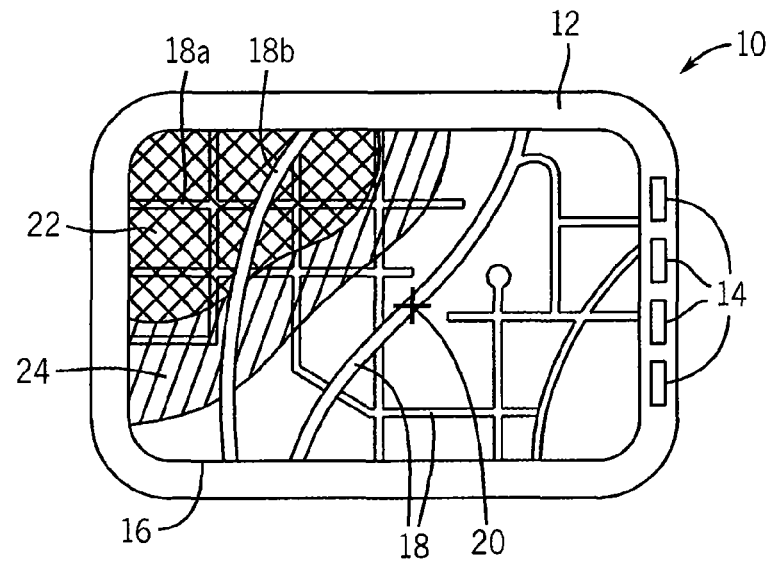
FIG. 1 is a simplified figure of a display of a GPS device per the present invention showing by shaded areas a graphical representation all of criminal risk.

Referring now to FIG. 1, a GPS device of a type that may be mounted in a car or the like may provide a housing 12 supporting one or more user controllable buttons 14 on the side of a color graphic display 16. As is generally understood in the art, the display 16 may depict a map showing streets 18 and a cursor 20 showing the location of the vehicle. The orientation of the streets may change to show the direction of travel of the vehicle according to standard conventions, for example, the direction of travel being vertical on the display 16.

The present invention may further provide for a first and second zone of shading 22 and 24 superimposed on the map and depicting a measure of the crime in the vicinity of the cursor 20. The shading may be different brightnesses, colors, or highlighting, a density of points (either randomly placed or each indicating a crime), or simply boundary markings according to techniques well known in the art and may cover particular streets 18 (to be visually in front of the street) or be covered by the street (to be visually behind the street) reflecting the degree to which the crime risk indicated by the shading affects those on the street.

For example, a local street 18a might be covered by shading 22 denoting a likelihood of auto theft. This is because auto theft would affect anyone parking on the local street 18a. Conversely, a limited access highway 18b may be positioned visually in front of the shading 22 denoting a likelihood of auto theft, because travelers on the highway 18b would not be susceptible to problems of auto theft. A shading 24 denoting weapon crimes, on the other hand, might cover limited access highway 18b to the extent that such activity reflects a more significant risk to highway travelers.

Figure 2:
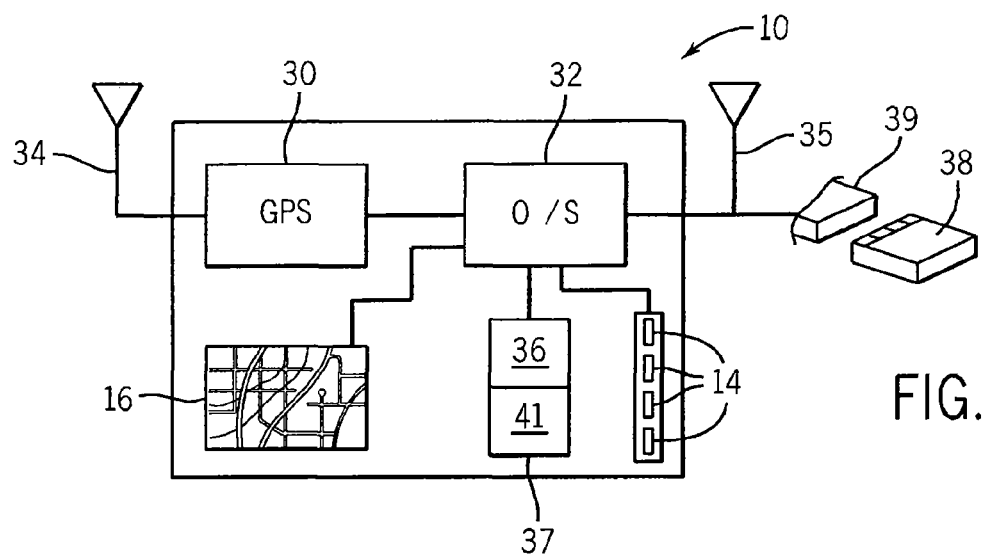
FIG. 2 is a block diagram of the components of the GPS system of FIG. 1 including map and crime data memories.

Referring now to FIG. 2, the GPS system 10 may employ standard GPS electrical architecture including a GPS receiver 30 communicating with a microcontroller 32 executing a standard operating system program. The GPS receiver may receive a GPS signals through a GPS antenna 34 and relay position information and time information to the microcontroller 32. The microcontroller 32 may in turn control the display 16 to output the map of FIG. 1, for example, according to map data 36 held in a memory 37 and according to the time and position information from the GPS receiver 30. The microcontroller 32 may also include an antenna 35, or a socket 39 for standard memory card 38, or other media input allowing downloading of map data 36 and crime risk data 41 into the GPS system 10.

This crime risk data 41, as will be described, provides data compatible with the map data 36 to produce the shadings 22 and 24 described above. In particular the crime risk data 41 may provide for geographic coordinates demarcating zones of crime risk represented by areas of the shading 22 and 24, crime risk types represented by colors, textures, or brightness of the shading 22 and 24, and crime risk severity also represented by colors, textures or brightnesses. Different crime risk data 41 for a given location may be keyed to different times during the day, for example, business hours and after the business hours as will be described below. Alternatively or in addition the crime risk may be keyed to dates or ranges of dates to reflect seasonal variations, for example, weather or tourist influx. Alternatively, when the crime data is collected it may be linked to environmental conditions such as air temperature, phase of the moon, precipitation. For GPS systems that provide updated weather information be presented crime data may be adjusted to conform to those current environmental conditions. The crime risk types may include and distinguish among, for example, auto theft, assaults against persons, drug arrests, traffic violations such as speeding, and the like. In addition non-crime data proxies may be provided such as population density, average income, density of government buildings and police stations, and the like.

Figure 3:
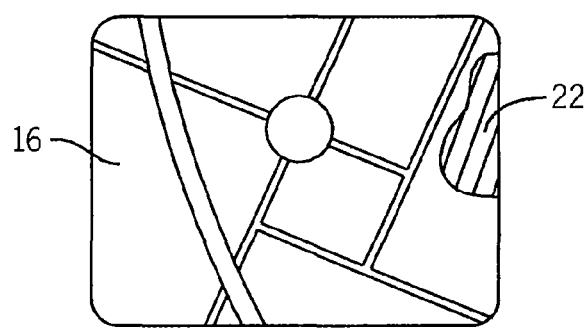
FIG. 3 is a figure similar to that of FIG. 1 showing the GPS display at a first time of day.
Figure 4:
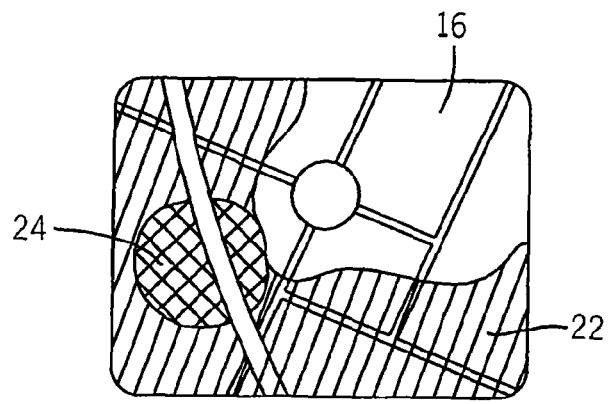
FIG. 4 is a figure similar to that of FIG. 3 showing the GPS display at a later time of day.

Referring now to FIG. 3, the keying of crime data to different times of the day allows the display 16 to provide for different crime shadings 22 and 24 depending on the time derived from a clock of the GPS receiver 30. For example, during business hours, as shown in FIG. 3, a crime zone of shading 22 might be fairly isolated representing streets that are not main thoroughfares or the like, whereas at a later time, for example, after the normal business day, crime zone of shading 22 may increase and a new zone of crime shading 24 may appear. The user may be given a feature allowing them to accelerate the clock to look at the transition of crime during the day in animated form. In one display mode, the animation may cycle through the current day with a depiction of the time of day so as to give the user an indication of changes in crime patterns that they may experience in that area.

Figure 5:
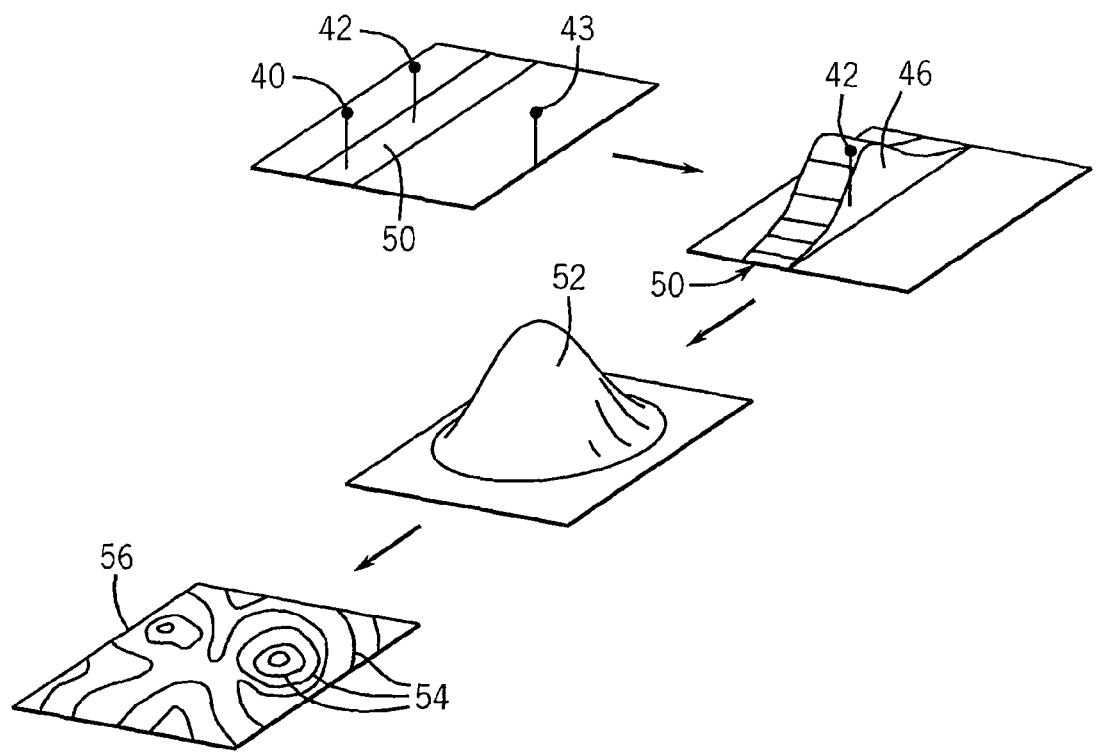
FIG. 5 is a set of graphical representations of the transformation of point crime data into the crime mapping of the present invention.

Referring now to FIG. 5, crime data may be obtained from a variety of public sources, generally as crime points 40, 42 or 43 where a given crime will be identified as to type, time of day and date, and location on a geographic grid 44. This data may retained as point data indicating an incident of a crime type (for example through color) and its location, or may be turned into areal crime shadings 22 and 24 through the use of a first two-dimensional convolution kernel 46 applied to each crime point 40, 42 and 43 (only crime point 42 shown for clarity) where the two-dimensional convolution kernel 46 is aligned with each transportation corridor 50 on the grid 44 reflecting a general propensity of crime risk to travel with people along transportation corridors. In this case, a simple two-dimensional Gaussian curve may be used as the convolution kernel 46 reflecting a general fall off of crime as one moves away from the crime scene. A sum of the results of the two-dimensional convolution kernel 46, applied to each crime point 40 42 and 43, for each transportation corridor 50, may then be modified by a general blurring convolution kernel 52 which provides a smooth continuity of crime risk over broader area. The height of the surface created after the convolution by kernel 52 may be represented by iso-crime lines 54 assigning both spatial extent and risk to each particular crime type.

As will be understood, a crime map 56 is created from the iso-crime lines 54 and stored in the GPS system 10. A crime shading 22 or 24 can then be created by applying a predetermined threshold to the crime map including the area within iso-crime lines 54 greater than or equal to this threshold. Typically this threshold will be set by the manufacturer but may be adjusted by the user to allow their risk propensities to be respected.

In cases where the crime data is sparse at the given magnification of the map, invoking the crime data it may cause a zooming out all the map to a resolution were meaningful crime statistics can be displayed. The user may set the thresholds for the amount of crime risk to be displayed and the types of crime to be displayed, for example opting to show only severe crime risks or crime risks key to the current time of day, range of dates, or environmental conditions. The user may opt to view only actual crime data or actual crime data and crime data derived from proxy sets as will be described.

The crime maps of 56 may be updated periodically and provided to subscribers to give them ongoing indications of possible risks.

Figure 6:
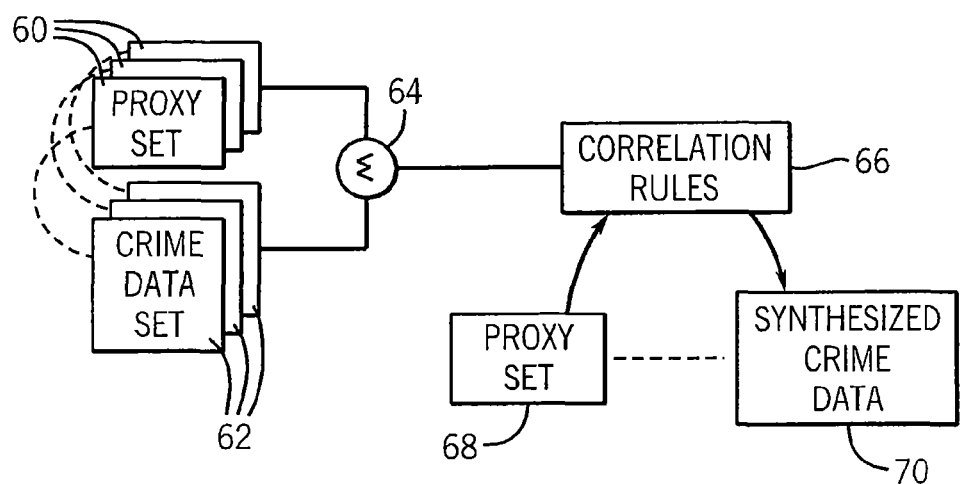
FIG. 6 is a flow chart showing statistical development all of crime data from crime proxies.

Referring now to FIG. 6, not all jurisdictions provide crime data and there may be some situations where crime data provided by a particular area is suspect or incomplete. In these cases the user may still be provided with crime shadings 22 and 24 by using a statistical process in which more readily available data termed "proxy sets" 60 are collected for various geographical regions. These proxy sets may include, for example, standard census data including population density and income ranges, and may be augmented with commercially available data such as home prices, loan defaults, insurance claims, and the like. Without the need to understand the sociological implications of this demographic data, the proxy sets 60 may be correlated to known crime data 62 for the same regions by a correlation process 64 of type well known in the art to produce a set of correlation rules 66 relating one kind of data to the other. For example, through standard regression, a formula may be developed equating the proxy set with particular crime risk. These correlation rules 66 may be applied to proxy sets 68 of other jurisdictions having unknown or suspect crime data to develop synthesized crime data 70 that may still provide the user with some guidance in areas where there would otherwise be no guiding data.

Figure 7:
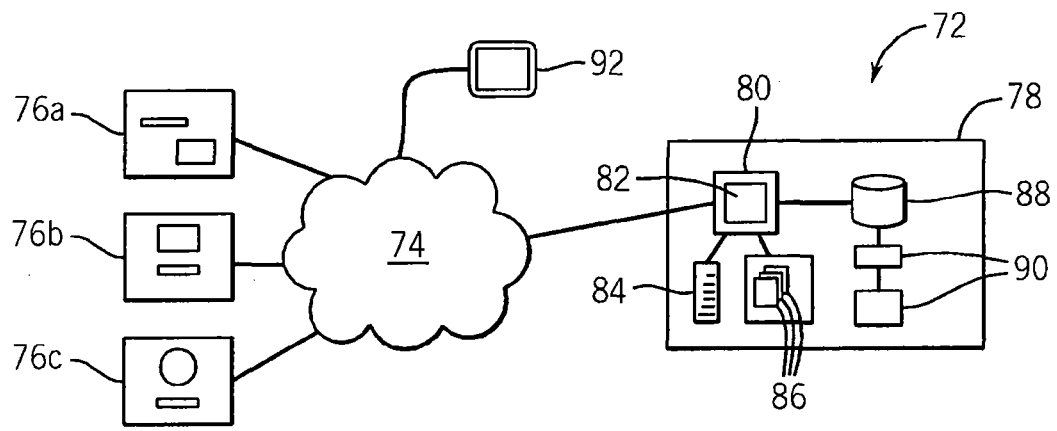
FIG. 7 is a block diagram of an extraction system for collecting comprehensive crime data on a real-time basis.

Referring now to FIG. 7, the collection of high-resolution crime data providing time place and crime type as is necessary to produce the present invention is hampered by two significant factors. First, in the United States, and in most countries, police activity is exclusively in the hands of local governments who therefore hold the exclusive right to the operation of a police force and the collection and dissemination of crime data. Such government entities operate outside of the private sector and can be indifferent to market demands to provide comprehensive and accessible crime data. The control of this data by local governmental entities can also create a disincentive to make crime data freely and easily available if that data may reflect poorly on local communities. These factors are reflected in the wide variety of different websites reporting crime data in a tabular form that requires entry of specific addresses before data will be released.

Accordingly, the present inventors have developed an extraction system 72 operating over the Internet 74 to interact with various different crime-reporting sites 76a-76c in the manner of an individual user capable of adapting to idiosyncratic user interfaces. The extraction system 72 collects data and compiles it into a comprehensive view of the crime situation in a particular area.

In a preferred embodiment, the extraction system 72 comprises a Web connected computer 78 having a browser 80 executing a gathering program 82. The gathering program 82 employees a Web address list 84 holding URLs of the particular websites 76a-76c through which this data is provided. The gathering program 82 further includes a set of scripts 86 uniquely identified to one website 76 and that provides set of steps for iteratively extracting a full set of data from the particular website 76. The crime data extracted from the website is stored in a uniform format in a database 88 that may be also implemented on the extraction system 76. If the website requires authorization to access the database of information, login information can be extracted from the page by searching for text after the terms "user" and "password" if that cannot be found the server will check for a password to the site stored in the database. Alternatively if the website requires authorization or password which is protected by requiring a user to respond to a CAPTCHA. In this case either a user can oversee any CAPTCHA each time the server runs the gather process or alternatively the page with the CAPTCHA can be sent to a Amazon (or other company) providing a "Mechanical Turk" program where human operators are paid small amounts of money to do simple tasks that are difficult of a computer. In this manner the gatherer can function without direct user intervention by the server administrator.

A map generation program 90 converts the data of the database 88 into the desired map formats and may download them again over the Internet 74 to particular users of GPS devices 92.

Figures 8, 9:
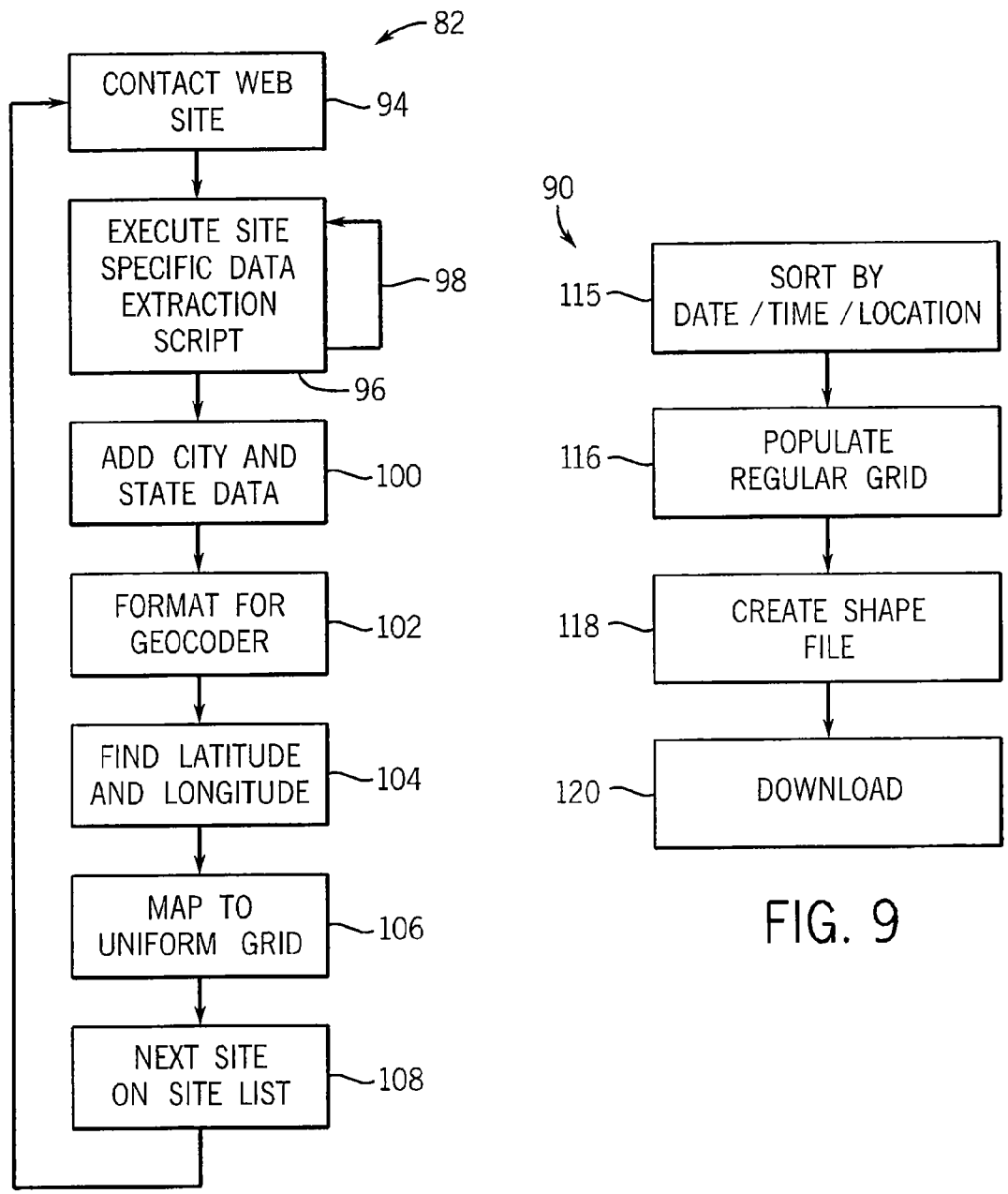
FIG. 8 is a flow chart of the program executed by the extraction system of FIG. 7.
FIG. 9 is a flowchart of a map creator program used with the extraction system of FIG. 7.

Referring now to FIG. 8, the gathering program 82 may begin operation as indicated by process block 94 by contacting an individual website (for example 76a) identified for example by the first web address on Web address list 84. At succeeding process block 96, the gathering program 82 executes the particular script 86 necessary to extract the data from that websites 76a. The script 86 will typically execute repeatedly as indicated by arrow 98, for example, entering in each address on a given street to check the occurrence of crime at that address, if necessary. The scripts 86 will be customized to the particular websites 76 to extract crime type, crime location, and crime time.

At succeeding process block 100, additional data may be added to the extracted data from the script 86 itself to provide a complete picture of the crime incidents. Most typically, this added data will be a city and a state which are normally implicit in the data of the particular website 76 but not contained per se in the data output from that website 76. As noted, data is then formatted in a consistent form and provided to a geocoder 102, being a website that will take a street address and converted to a longitude and latitude value per process block 104. At the conclusion of this process, a data structure will be obtained and stored in the database 88 as indicated in the following Table 1.

for example, according to a user request, the data of the database 88 is sorted by map generation program 90 to obtain crime statistics in a particular area of the world (for example, as defined by a set of UTM numbers) at a particular time and date range. The date range may be dynamically adjusted to obtain a statistically significant sampling of data for the crime map weighting which is most current. In this respect, the data may span more than one year, for example, for seasonal data, looking at comparable seasonal crime during previous years to establish a trend line used to establish current crime values.

TABLE 1

| SAddress | City | State | Zip | Geo | CrimeCode | CrimeDes | Date/Time | UTM Square |
|---|---|---|---|---|---|---|---|---|
| 111 E WISCONSIN AV | Milwaukee | WI | 53202 | 43.038539, −87.909517 | 1 | ALL OTHER LARCENY | Oct. 16, 2007 08:11 AM | 34 |
| 1216 E BRADY ST | Milwaukee | WI | 53202 | 43.053092, −87.896512 | 5 | ALL OTHER LARCENY | Oct. 16, 2007 09:10 PM | 31 |
| 2066 N CAMBRIDGE AV | Milwaukee | WI | 53202 | 43.058249, −87.891785 | 5 | THEFT FROM MOTOR VEHICLE | Oct. 17, 2007 11:11 PM | 22 |
| 133 N JACKSON ST #233 | Milwaukee | WI | 53202 | 35.644868, −88.857165 | 1 | ALL OTHER LARCENY | Oct. 18, 2007 3:11 AM | 34 |

This data structure provides a particular address of a crime and the city, state, and (optionally) zip code, shown in the first through fourth columns. This information, when fed to the geocoder, provides a longitude and latitude value shown in the fifth column. A crime code is usually extracted from the website which provides a coding according to a standard FBI coding scheme or a variant on this scheme implemented by various localities. The script 86 translates these locally implemented codes into a standard FBI coding scheme and stores the code and a written description at columns 6 and 7. The date and time of the crime is also obtained and stored at column 8 to provide data specific to different seasons or times of the day. Whether data and almanacs may be consulted to add in information about environmental conditions for example air temperature, phase of the moon, precipitation that may improve the predictive power of the crime data when it is displayed. Thus, for example, when there is a new moon at night crime data may increase for some types of crime.

The program 82 next calculates a UTM grid value, as will be described below, identifying a regular region (e.g. a grid square) in which the crime occurred. This is indicated by process block 106 and added to the data structure at column 9.

At process block 108, after all the data is extracted from a given website 76a, the next site in the list 84 is accessed and this process is repeated. The extraction system may operate at regular intervals during the day preferably at times of low Internet use.

Figure 10:
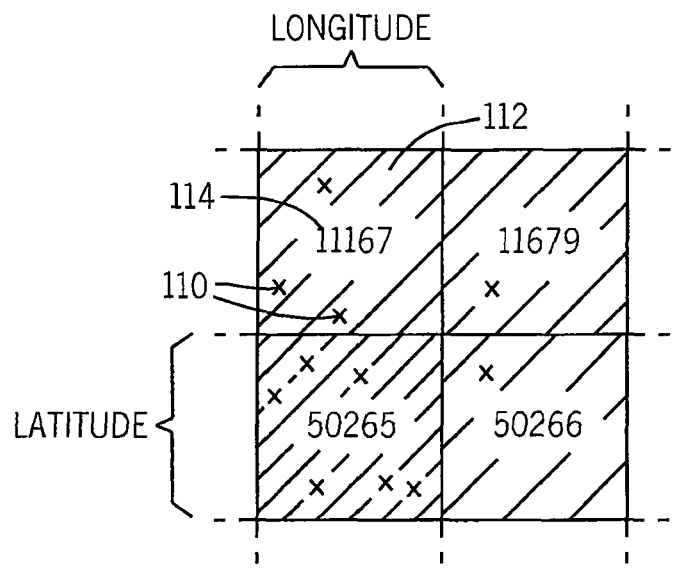
FIG. 10 is a schematic diagram of a shape file created by the map creator program of FIG. 9.
Figure 11:
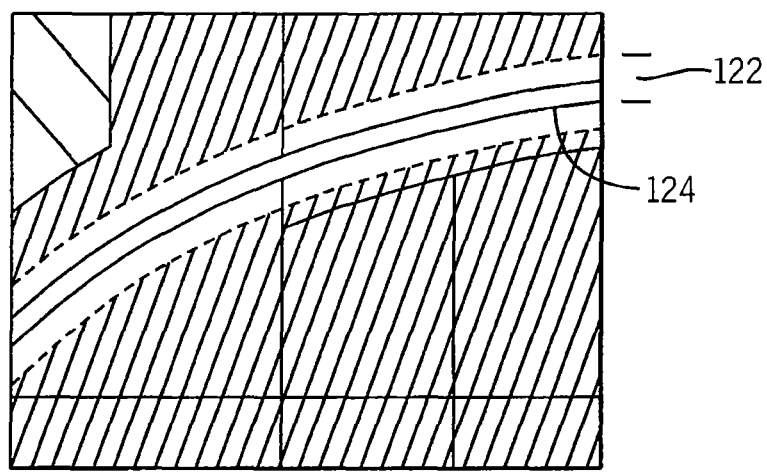
FIG. 11 is a figure similar to that of FIG. 1 showing accommodation of limited access highways in the display of the present invention.

Referring now to FIG. 10, a crime map may be generated from the data structure of Table 1 by dividing the world into regular polygons, in this case squares having a width and height of 0.005° of longitude or latitude or any size block depending on the granularity which is desired. The mapping to the grid described with respect to process block 106 above, then simply determines whether a particular crime incident 110 occurred within a particular UTM square 112, each UTM square 112 having a unique identifier 114. This mapping is precalculated at process block 106 for greater speed in map generation or done at this time for greater flexibility in determining types and times of crime.

Referring now to FIG. 9, the generation of a map may be performed on demand beginning at process block 115 where, at process block 116, the sorted data, in one embodiment, is then used to populate a grid of UTM squares 112 within in area to the desired map. The number of crime incidents in each UTM square 112 is then mapped to a color for the square, for example, green shades indicating relatively low crime rates and red shades indicating relatively high crime rates according to standard mapmaking conventions.

The color values all the UTM squares 112 are then assembled to create a shape file in a vector format defining polygons having vertices and a particular translucent shading value as determined by the number of crime incidents 110. This shape file creation is indicated at process block 118. The shape file may then be downloaded, as indicated by process block 120 to a GPS user and provides an overlay on existing maps already held in the GPS device and in a format that may be readily interpreted by most GPS systems.

Referring now to FIGS. 8 and 9, the shape file created at process block 118 may include a margin 122 around limited access highways 124 reflecting the fact that local crime statistics usually do not affect high-speed traffic on busy highways that may go through those neighborhoods. This margin 122 may increase as the scale of the map is increased to provide a visual indication of this feature for travel planning.

Figure 12:
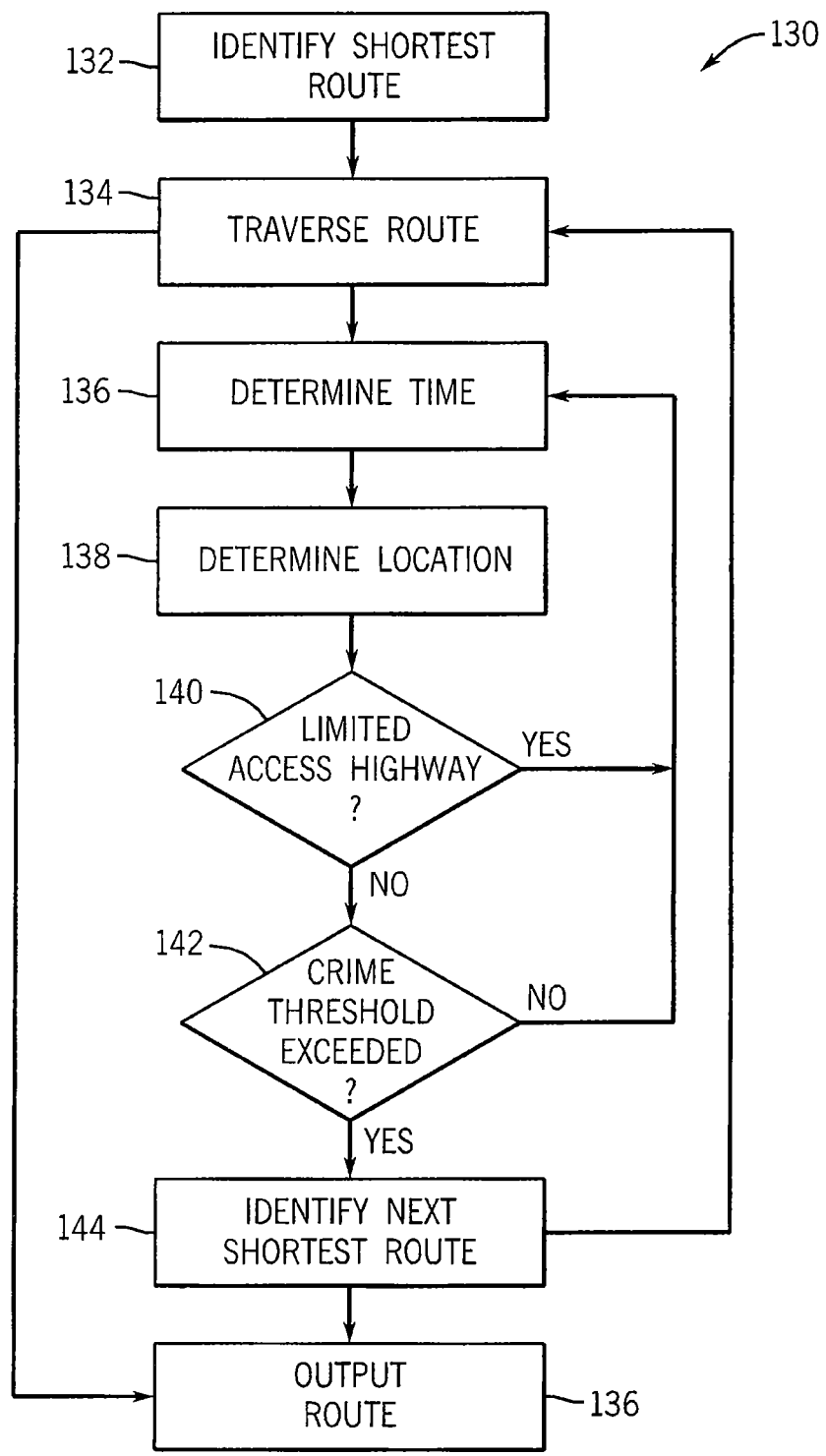
FIG. 12 is a flowchart of a program using the crime data developed by the present invention for route planning purposes.

Referring to FIG. 12, the present invention also provides a method of incorporating crime data, as described above, into the route planning process. Using the database 88 developed above with respect to FIG. 8, travel planning program 130, such as may operate on a computer similar to that described in FIG. 7, may use standard routing techniques per process block 132 to identify a shortest route between two points identified by the user. At process block, 134 that route is traversed point by point per process blocks 136-144.

If the user has identified a starting time, then as the route is traversed, that time is updated per process block 136 by regular increments and a location along the route determined at process block 138 using known statistics on road type or average traffic velocity. If the user has not identified a starting time an arbitrary time of zero is selected and the time of occurrence of the crimes is ignored.

At decision block 140, it is determined whether, at the particular location determined by process block 138, the route is on a limited access highway. If so, the program 130, loops back to process block 136 to continue traversal of the route. If at decision block 140 the user is not on a limited access highway, but instead on a local road, then at decision block 142 the crime statistics in the UTM square 112 of the location is reviewed to see whether a crime threshold (selectable by the user) has been exceeded. If not, the program 130 loops back to process block 136 to continue traversal, but if so, a new second shortest route (under the constraint of not using the road passing through the indicated crime zone) is determined and the traversal process is reinitiated looping back to process block 134. When a route has been fully traversed without exceeding the desired crime threshold, the route is output as indicated by process block 136.

This same process could be used to assess the travel risk of a particular route and assign it a quantitative value that could be used for example by shipping or trucking companies to add a safety surcharge based on whether their vehicles travel into unsafe areas.

The collection of crime data can be augmented by enlisting users of the GPS device itself. Such users, perhaps provided with an incentive with respect to obtaining crime data, can report on their perceptions of crime in the area where they live or with an advanced GPS system providing for two-way communication by entering simple data into the GPS device reflecting their perception of their current location for example "this area is safe" or "this area is unsafe". While this data would not necessarily be as reliable as other types of crime data, its quality could be factored into an assessment of total crime risk. Further this sort of data may have greater weighting near the time of the reporting.

Crime data obtained from public sources and through the use of proxies can also be augmented by crime data reported on paper the latter which may be analyzed using optical character recognition or manually input. In this way data can be collected from any source even those not reporting electronically.

Integrating the current crime system into a concierge service such as COMMAND from Mercedes or ONSTAR from GM could be used to increase response times for calls generated by stopped vehicles in high crime areas.

Referring now to FIG. 13, a computer system 210 useful for production of crime data per the present invention may provide a server/computer 212 executing a stored program 214 to communicate on the Internet 216 with a remote database 220 through a server 218. The remote database 220 may, for example, include crime data collected by municipalities and the like in addition to ground level images of particular geographic locations. The database 220 need not be a single installation and may, in fact, represent multiple servers 218 and databases 220 accessible through the Internet 216.

Multiple individual computers 222 may also communicate through the Internet 216 with the server/computer 212 to provide crime data input that will be stored in database 223.

Referring now to FIGS. 14 and 15, the program 214 may operate as indicated by process block 224 to identify sample points 227 in a geographic region 230 for which augmenting crime data is desired. Typically, such sampled points will be both in regions where official crime data is required (for bench marking purposes) and regions where scarce or no official crime data is available. Ideally the crime sample points will be randomly selected and dispersed.

For each sample point 227, a ground-level image 232 will be developed, for example, of panoramic view of greater than 180° and typically 360° at the sample point 227 as would be visible by a person on the ground. The particular sample points 227 may then be provided to the individual user of computer 222 together with an electronic scorecard to complete based on that image. The individual may be required to circle particular elements on a display screen to allow for machine scoring for each element with different weights for different feature of interest and to permit display of the circled elements to ultimate users for independent assessment of the scoring.

As indicated by process block 234, individuals at the computers 222 may then review the images 232 with respect to predetermined categories such as for example, overall impression, the visibility of trash, graffiti, late model cars (e.g. greater than 10 years old), state of repair of buildings, presence of window bars, quality of the roads, business types, number of residences visible, et cetera. These scorecards can be refined by an empirical testing in which actual crime data from law enforcement agencies as reduced to a crime index is compared to a risk value determined from the scorecard categories and correlated to identify those categories with highest correlation.

For example a questionnaire may provide the following questions:
(1) multiple pieces of visible trash (yes/no)
(2) multiple instances of visible graffiti (yes/no)
(3) visible window bars (yes/no)
(4) prepare state of road (good/average/poor)
(5) visible check-cashing stores (yes/no)
(6) visible disabled cars (yes/no)

A quantitative score may be developed using the following scoring:
question 1: yes=10, no=zero
question 2: yes=10, no=zero
question 3: yes=10, no=zero
question 4: good=0, average=5, poor=10
question 5: yes=10, no=zero
question 6: yes=10, no=zero For example, a questionnaire may be completed with respect to the predetermined categories and scored to produce a quantitative value of 70, for example, were higher values indicate higher crime risk. This value may then be compared to an index value derived from actual crime data, for example, indicating particular categories of crime and the number of incidents per time per area. This index value may be, for example, 80. A normalizing factor may then be developed equal to 80/70 and used to multiply the quantitative values provided from the questionnaire for areas where there is no official crime data. Thus, for example, an area with no official crime data may provide a questionnaire value of 60 and using the normalizing factor derived above of 80/70 may yield a normalized crime value of 68.5.

When a subjective evaluation of an individual is used in the scoring, a different normalization factor may be used for each such individual, to provide consistency among different individuals.

As indicated at process block 236, the proxy data obtained in this manner may be fit to known crime data in the region, if any, and used to provide for higher granularity crime data. Alternatively the proxy data may be used alone to determine the crime risk in an area. When a proxy is used, that fact may be indicated on the display screen to the user.

As indicated by process block 238, the crime data, being any or both of actual crime data and proxy data may then be used to provide a map output or the like such as a single indicator bar, graphic, number or the like useful for the user of a mobile phone, home computer, or automotive device, indicating an assessment of crime risk in the particular region selected by the user or derived from GPS or the like from the location of the user.

Referring now to FIG. 16, in the latter case, the map 240 may display standard map features such as roads 242 and the like and provide shaded zones 244 indicating generally a crime risk. Each zone may provide one or more images 246 providing reference for the user of the type of image data underlying a particular crime assessment. In this respect, the images may be ranked according to the amount that they are relied upon in the crime assessment and only the highest ranked image shown, to allow the user to make an independent assessment. The particular images may be highlighted to show features relied upon in the evaluation, for example circling or highlighting of a disabled car.

The scoring may be statistically processed, for example, by averaging scores in a number of regions and the statistical sampling may be adjusted depending on the score of neighboring regions to obtain additional data. That is, for example, those areas rated with high crime may receive additional sample points to reduce the possibility of an anomaly caused by a single poorly maintained building or the like. Generally, statistical techniques of smoothing, for example, data fitting to a limited order surface, may be applied to the proxy crime data as will be understood in the art.

It will be understood that the scoring of the images may also be done by computer algorithms using machine learning or the like. It will further be understood that the source of the crime assessment may be indicated to be through the use of proxy sources such as the scoring system described above when actual crime data is not available.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A method of deriving crime data for different regions comprising the steps of:
   (a) collecting image data of the regions;
   (b) scoring the image data according to proxies for crime risk; and
   (c) presenting a map of the regions on a graphic display terminal having multiple shaded zones depicting crime risk based on the scoring for each region.

2. The method of claim 1 further including the steps of:
   collecting reported crime data by law enforcement officials for at least some regions;
   comparing scores of the image data for the regions to the collected crime data for the regions to derive normalization information;
   applying the normalization information to the scores for regions where reported data by law enforcement officials has not been collected to provide uniform crime data for the different regions.

3. The method of claim 1 wherein the scoring of image data evaluates factors selected from the group of visibility of trash, visibility of graffiti, visibility of window bars.

4. The method of claim 1 wherein the scoring of image data evaluates factors selected from the group of visibility of late model cars, quality of a road surface, business types, number of residences visible.

5. The method of claim 1 wherein a spacing within the regions of a collection of image data of the region is adjusted according to the scoring of a region.

6. The method of claim 1 wherein the scoring is performed by individuals viewing the images.

7. The method of claim 6 wherein the images are presented to the individuals as a panorama of greater than 180°.

8. The method of claim 1 wherein the scoring includes a marking of images of the image data by the user viewing the images to highlight components of the scoring.

9. The method of claim 1 wherein the image data is obtained from Google Street View™.

10. A navigation system comprising:
    a graphics display;
    an electronic memory storing:
    (i) a street map; and
    (ii) crime data linked to locations;
    a computer executing a stored program and communicating with the graphics display, and the electronic memory to:
    (i) generate a display of a street map having different locations;
    (ii) generate an overlay to the street map depicting the crime data linked to different locations;
    (iii) generate an indication of whether the overlay is generated from officially collected crime data or from a proxy for crime data.

11. The navigation system of claim 10 wherein the computer further executes the stored program to provide an image of at least one of the locations used as a proxy for crime data.

12. The navigation system claim 11 wherein the image includes indicia marking elements of the image indicative of crime risk.

13. The navigation system of claim 10 wherein the street map identifies limited access highways and wherein the overlay is shading and the shading is excluded in a predetermined distance from limited access highways.

14. A navigation system comprising:
    a graphics display;
    an electronic memory storing:
    (i) a street map; and
    (ii) crime data linked to locations, the crime data based on components of at least one image of a location to which crime data is linked;
    a computer executing a stored program and communicating with the graphics display, and the electronic memory to:
    (i) generate a dynamic display of a street map of different locations;
    (ii) generate an overlay to the street map depicting the crime data linked to different locations;
    (iii) display the at least one image of at least one location representative the locations and depicting the components of the displayed image on which the crime data is based.

* * * * *